Dec. 30, 1930.   H. B. WALTER   1,786,467

PROTECTIVE MEANS FOR PIPES

Filed Jan. 2, 1930

Inventor
Harrison B. Walter
By E. A. Wagonseller  Atty.

Patented Dec. 30, 1930

1,786,467

UNITED STATES PATENT OFFICE

HARRISON B. WALTER, OF CHICAGO, ILLINOIS, ASSIGNOR TO CONTAINER CORPORATION OF AMERICA, OF CHICAGO, ILLINOIS, A CORPORATION OF DELAWARE

PROTECTIVE MEANS FOR PIPES

Application filed January 2, 1930. Serial No. 417,966.

The present invention relates to protective means for pipes and more particularly to means for protecting the threaded ends of metal pipes and tubing.

It has heretofore been customary to protect the threaded ends of metal pipes during handling and shipment by metal couplings. The coupling applied to one end of the pipe is one which is suitable for subsequent use when sections of pipe are coupled together. The coupling at the other end of the pipe is usually of a relatively light, cheap structure formed in the same manner as a regular coupling as regards threading but made of rather thin metal so as to reduce the cost thereof to a minimum. While these light protective metal couplings are satisfactory in so far as giving protection to the pipe is concerned and could well be used many times, it has been found that this method of protecting the pipe is rather expensive since the protective couplings are practically never returned for reuse.

The object of the present invention is to provide a protective device for the ends of threaded pipe which is sufficiently strong to withstand all the rough usage to which the pipe is generally subjected and at the same time provide a protective device which can be manufactured very cheaply, which can be very quickly applied to the end of the pipe in a permanent and secure manner and which can be readily removed and discarded.

To these and other ends the invention resides in certain improvements and combinations of parts, all as will be hereinafter more fully described, the novel features being pointed out in the claim at the end of the specification.

In the drawing.

Similar reference numerals throughout the several views indicate the same parts.

Figure 1:
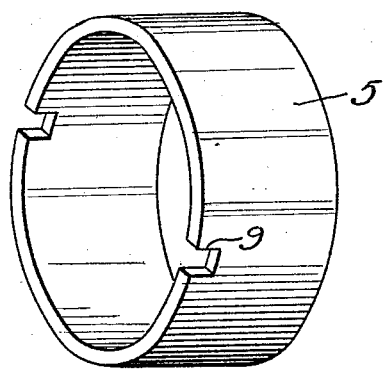
Fig. 1 is a perspective view of a pipe protective device made in accordance with the present invention.

The protective device embodying the present invention is indicated as a whole at 5 and comprises a cylindrically shaped sleeve of fibrous material which in the present instance is preferably made up of so-called "chip board" which is composed principally of waste paper with a smaller proportion of stronger pulp. While the protective device may be formed from fibrous material other than "chip" this material has been found preferable by reason of its relatively soft texture which renders it capable of being locally deformed and thereby capable of adapting itself more accurately to the particular surface to which it is applied.

In the present embodiment of the invention the sleeve or cylinder 5 is formed from a section of spiral wound tubing in which a plurality of plies of chip board have been assembled by the use of a suitable adhesive such as silicate of soda. The presence of the silicate of soda between the plies tends to stiffen the sleeve 5 and help it to maintain its shape under varying conditions before and after being applied to the end of the pipe. The interior surface of the sleeve 5 is of a character which permits of ready deformation thereof upon local pressure such as will be produced by the forcing of the tube over the threaded end of a pipe by direct pressure or by threading it on with a rotative movement.

The sleeve 5 is preferably at least partially impregnated with a suitable water resistant substance such as paraffin or wax. This may be effected by immersing the severed sleeves or cylinders in a bath of melted paraffix wax or a similar substance. Partial impregnation of the material of the sleeve provides several important functions: The sleeve is thus rendered waterproof so that it will not be affected by the presence of moisture which might thus cause it to soften and become easily removed from the end of the pipe. The wax on and in the material of the interior of the sleeve provides for a certain amount of lubrication and thereby facilitates the assembly of the sleeve on the end of the pipe and this is true regardless of whether the sleeve is forced into place by a linear movement or threaded into place by a rotating movement.

In the present instance it has been found preferable to only partially impregnate the material of the sleeve with wax rather than to impregnate it throughout. In the first place there is a saving of wax which keeps the cost of the sleeve down to a minimum; and, in the second place, there is provided a sufficient amount of wax to give a preliminary lubriation between the inner surface of the sleeve and the contacting portions of the threads and at the same time there is still sufficient friction between the sleeve and the pipe threads tending to prevent too easy removal of the sleeve in cases where it might be subjected to considerable vibration, pounding, or other rough usage.

Due to the fact that the material is only partially impregnated, the pipe threads, after becoming more or less imbedded in the material, displace the impregnated portion and enter a portion having no wax content or a very reduced wax content. When in contact with this portion of the material there is produced a considerable amount of friction between the threads and the material which thereby causes the sleeve to grip the pipe very securely.

Figure 2:
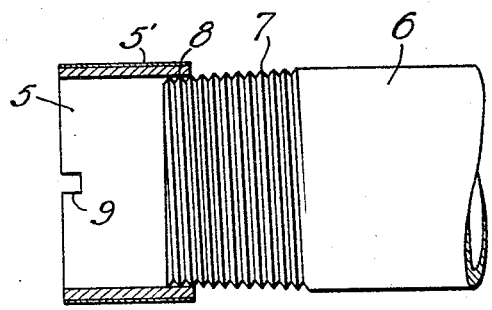
Fig. 2 illustrates the protective device as it appears when loosely fitted over the end of a pipe.
Figure 3:
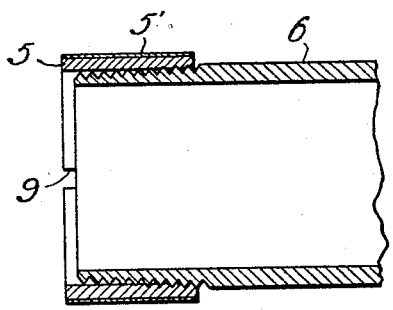
Fig. 3 is a view in cross section illustrating the protective device completely assembled on the end of a threaded pipe.

Fig. 2 illustrates a section of pipe 6 having a threaded end 7 which the protective sleeve of the present invention is designed to protect. The sleeve 5 will preferably have an internal diameter large enough to readily slip over one or more of the threads 8 on the tapered end of the pipe. When the protective sleeve 5 is in position substantially as illustrated in Fig. 2 it may be moved to its final position as illustrated in Fig. 3 by several sharp blows applied to the outer end of the sleeve or by rotating the sleeve in a direction to thread it onto the end of the pipe. When the former method is used the threads of the pipe will, during the first part of the movement, slide with respect to the interior of the sleeve and as the engagement between the interior of the sleeve and the threads becomes tighter, the threads will begin to dig into and displace the material on the surface and carry it partly along with the threads so that the displaced material will lie between the threads and the interior of the sleeve. This tends to cause the sleeve to grip the pipe threads very snugly.

The outer surface of the sleeve of the present invention is preferably strengthened and stiffened by a relatively hard outer covering. In the present instance this is in the form of a comparatively thin strong liner sheet 5' made of a good grade of pulp such as ordinary kraft pulp. The stiff and strong outer covering for the sleeve tends to maintain the shape of the cylinder even though the softer inner surface has been considerably deformed by threading it onto the end of a pipe.

It has been found desirable for certain purposes to provide means whereby the sleeves may be threaded onto the end of a pipe by means of a wrench or similar tool. For this purpose one or more notches, indicated at 9, are provided in the edge of the sleeve. Where two oppositely disposed notches 9 are provided, as indicated in Fig. 1, the sleeve may conveniently be threaded onto the end of the pipe by means of a straight bar, such as a piece of strap iron. In practice the notches 9 will be about ¼ inch in depth and it is desirable that about ¼ inch of the sleeve be left projecting beyond the end of the pipe in order to act as a cushion against jambs caused from end thrusts during handling. Thus, when the workman screws a sleeve in place as by means of a bar inserted in the notches 9, when the bar contacts the end of the pipe the workman will then know that the sleeve is not to be screwed on any further. It will thus be seen that, in this way, the workman will readily be made aware that the sleeve has been brought to its proper or desirable position with respect to the end of the pipe and, by this method, even a careless workman will not be likely to thread the sleeves too far onto the pipe.

It is apparent from the foregoing that the present invention provides a protective means for pipe threads which may be cheaply and rapidly made from inexpensive material. The soft inner surface of the sleeve adapts itself readily to the threads of a pipe as it is capable of being readily deformed.

By this construction a sleeve is provided having sufficient body and elasticity to cause it to adhere firmly to the end of a pipe when it is forced into engagement with the threaded portion of a diameter slightly greater than the internal diameter of the sleeve.

The inner surface of the sleeve, coated with waterproofing compound, thus partially or wholly embraces the individual threads and effectively prevents rusting or other corrosion. By reason of the strong outer covering of the sleeve the danger of the sleeve breaking or splitting even under considerable strain is obviated.

While paraffin wax or similar materials have been referred to as giving a waterproof character to the sleeve of the present invention it is obvious that other materials could, if desired, be employed for this purpose.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claim rather than to the foregoing description to indicate the scope of the invention.

I claim:

A protective device for the ends of threaded metal pipe comprising a sleeve of fibre material having a relatively soft, easily deformable inner portion and a stiff, strong outer portion, said sleeve having an internal diameter sufficient to permit it to be slipped partially over the tapered threaded end of a pipe and having sufficient body and elasticity to cause it to adhere firmly to the end of the pipe when said sleeve is forced into engagement with the threads of increased diameter, a waterproof coating for the thread contacting portion of said sleeve, said coating impregnating the material to a depth such that certain of the threads of larger diameter will pass substantially through the impregnated portion of the sleeve and will engage with a portion of lesser impregnation whereby the friction between said sleeve and pipe will be materially increased.

Signed at Chicago, Illinois, this 27th day of December, 1929.

HARRISON B. WALTER.